US010761880B2

(12) United States Patent
Hsieh

(10) Patent No.: US 10,761,880 B2
(45) Date of Patent: Sep. 1, 2020

(54) DATA STORAGE DEVICE, CONTROL UNIT THEREOF, AND TASK SORTING METHOD FOR DATA STORAGE DEVICE

(71) Applicant: Silicon Motion, Inc., Jhubei, Hsinchu (TW)

(72) Inventor: Chao-Kuei Hsieh, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 52 days.

(21) Appl. No.: 15/214,457

(22) Filed: Jul. 20, 2016

(65) Prior Publication Data

US 2017/0308396 A1 Oct. 26, 2017

(30) Foreign Application Priority Data

Apr. 21, 2016 (TW) .............................. 105112505 A

(51) Int. Cl.
*G06F 9/48* (2006.01)
(52) U.S. Cl.
CPC .................................. *G06F 9/4806* (2013.01)
(58) Field of Classification Search
None
See application file for complete search history.

(56) References Cited

U.S. PATENT DOCUMENTS

| | | | | | |
|---|---|---|---|---|---|
| 4,516,201 A | * | 5/1985 | Warren | .................... | G06F 13/38 709/234 |
| 5,371,887 A | * | 12/1994 | Yoshida | ................. | G06F 9/3851 711/202 |
| 5,379,428 A | * | 1/1995 | Belo | ....................... | G06F 8/451 711/173 |
| 5,542,088 A | * | 7/1996 | Jennings, Jr. | ......... | G06F 9/4881 718/103 |
| 6,360,243 B1 | * | 3/2002 | Lindsley | ............... | G06F 9/4812 712/22 |
| 7,237,036 B2 | * | 6/2007 | Boucher | ............... | G06F 13/385 370/396 |
| 7,370,326 B2 | * | 5/2008 | Jones | .................... | G06F 9/4881 709/238 |

(Continued)

FOREIGN PATENT DOCUMENTS

| | | |
|---|---|---|
| CN | 101470626 | 7/2009 |
| CN | 101470631 | 7/2009 |

(Continued)

OTHER PUBLICATIONS

Office Action issued by Taiwan Intellectual Property Office dated Jan. 23, 2017.

*Primary Examiner* — Van H Nguyen

(57) ABSTRACT

A data storage device includes a data storage medium and a control unit. The control unit is electrically connected to the data storage medium. When switched to a command queue mode, the control unit is configured to receive a queue command comprising at least one task from a host, determine whether the at least one task is a ready-for-execution task, sort at least one ready-for-execution task and selectively reply the host with first queue status information. The first queue status information contains a task quantity corresponding to the at least one ready-for-execution task and at least one task serial number corresponding to the at least one sorted ready-for-execution task.

3 Claims, 5 Drawing Sheets

(56) References Cited

U.S. PATENT DOCUMENTS

| | | | |
|---|---|---|---|
| 7,523,235 B2 * | 4/2009 | Nemazie | G06F 13/4022 370/229 |
| 8,060,670 B2 * | 11/2011 | Yu | G06F 13/1684 710/10 |
| 8,365,011 B2 * | 1/2013 | Suzuki | G06F 11/1443 714/4.5 |
| 8,527,735 B2 * | 9/2013 | Ryu | G06F 3/0611 711/203 |
| 9,058,208 B2 * | 6/2015 | Chang | G06F 9/4881 |
| 9,268,636 B2 * | 2/2016 | Chung | G06F 11/1048 |
| 9,519,440 B2 * | 12/2016 | Shacham | G06F 13/4243 |
| 9,606,833 B2 * | 3/2017 | Vrind | G06F 9/4887 |
| 2004/0049628 A1 | 3/2004 | Lin et al. | |
| 2004/0151197 A1 | 8/2004 | Hui | |
| 2004/0172631 A1 * | 9/2004 | Howard | G06F 9/30087 718/100 |
| 2005/0240924 A1 * | 10/2005 | Jones | G06F 9/4881 718/100 |
| 2007/0260756 A1 * | 11/2007 | Tseng | G06F 13/28 710/5 |
| 2008/0195833 A1 | 8/2008 | Park | |
| 2009/0235111 A1 * | 9/2009 | Suzuki | G06F 11/1443 714/4.1 |
| 2010/0030789 A1 * | 2/2010 | Goto | G06F 11/1443 707/636 |
| 2010/0262979 A1 | 10/2010 | Borchers et al. | |
| 2012/0311197 A1 | 12/2012 | Larson et al. | |
| 2014/0137128 A1 * | 5/2014 | Chang | G06F 9/4881 718/103 |
| 2015/0293793 A1 * | 10/2015 | Vrind | G06F 9/4887 718/103 |

FOREIGN PATENT DOCUMENTS

| | | |
|---|---|---|
| CN | 103809917 A | 5/2014 |
| TW | 201419157 | 5/2014 |

* cited by examiner

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | 0 | 0 | 0 | | | | | 0 | | | | | | | 15 | | | | | | 6 | | | | | 21 | | | | 0 | 4 |

⎵ task4 ⎵ task3 ⎵ task2 ⎵ task1

FIG. 3

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 1 | 0 | 0 | 0 | 0 | 0 | 1 | 1 | 0 | 0 | 0 | 0 | 0 | 0 | 0 | 1 | 0 | 0 | 0 | 0 | 0 | 1 |

FIG. 4
(Prior Art)

DATA STORAGE DEVICE, CONTROL UNIT THEREOF, AND TASK SORTING METHOD FOR DATA STORAGE DEVICE

FIELD OF THE INVENTION

The present invention relates to a technology related to data structure, and more particularly to a data storage device, a control unit for controlling the data storage device and a task sorting method.

BACKGROUND OF THE INVENTION

In the conventional technology, the host (such as computer or mobile phone) issues a specific command to an electrically-connected data storage device (such as flash memory, etc.) according to the industry standard. Correspondingly, the data storage device replies the host about which tasks are ready for execution in response to the specific command. Then, the host issues a command to inform the data storage device to perform either a read or a write operation.

However, according to the conventional technology, although the data storage device can reply the host with a plurality of ready-for-execution tasks, the host cannot determine a better executing order of these ready-for-execution tasks. For example, the data storage device can efficiently execute a specified task. However, actually the host asks the data storage device to execute another task. Therefore, the data storage device must reallocate the system resource to complete the task. Thus, it is an important subject for the person in the art to make the host and the data storage device communicate with each other more efficiently and make the tasks ready for execution properly arranged.

SUMMARY OF THE INVENTION

Accordingly, one objective of the present invention is to provide a data storage device capable of communicating with a host more efficiently.

Another objective of the present invention is to provide a control unit capable of making the host access the data stored in the data storage device more efficiently.

Still another objective of the present invention is to provide a task sorting method for the data storage device.

The present invention provides a data storage device, which includes a data storage medium and a control unit. The control unit is electrically connected to the data storage medium. When switched to a command queue mode, the control unit is configured to receive a queue command comprising at least one task from a host, determine whether the at least one task is a ready-for-execution task, sort at least one ready-for-execution task and selectively reply the host with first queue status information. The first queue status information contains a task quantity corresponding to the at least one ready-for-execution task and at least one task serial number corresponding to the at least one stored ready-for-execution task.

The present invention further provides a control unit, which includes a control logic, an interface logic and a microprocessor. The microprocessor is electrically connected to the interface logic and the control logic. The microprocessor is configured to access data stored in a data storage medium through the control logic, receive a queue command comprising at least one task issued from a host through the interface logic, determine whether the at least one task is a ready-for-execution task, sort at least one ready-for-execution task and selectively reply the host with first queue status information. The first queue status information contains a task quantity corresponding to the at least one ready-for-execution task and at least one task serial number corresponding to the at least one stored ready-for-execution task.

The present invention still further provides a task sorting method for a data storage device. The task sorting method includes: switching to a command queue mode; receiving a queue command from a host, wherein the queue command comprises at least one task; queuing the at least one task; determining whether the at least one queued task is a ready-for-execution task; sort at least one ready-for-execution task; and selectively replying the host with first queue status information, wherein the first queue status information contains a task quantity corresponding to the at least one ready-for-execution task and at least one task serial number corresponding to the at least one stored ready-for-execution task.

In summary, by configuring the data storage device of the present invention to provide the queue status information, the host can sequentially execute the ready-for-execution tasks according to the task quantity and task serial number of the ready-for-execution tasks contained in the queue status information; and therefore, the data storage device of the present invention has improved executing performance.

BRIEF DESCRIPTION OF THE DRAWINGS

Other advantages, objectives and features of the present invention will become apparent from the following description referring to the attached drawings.

FIG. 3 a schematic view of an exemplary data structure of queue status information in accordance with an embodiment of the present invention;

FIG. 4 a schematic view of an exemplary data structure of conventional queue status information.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
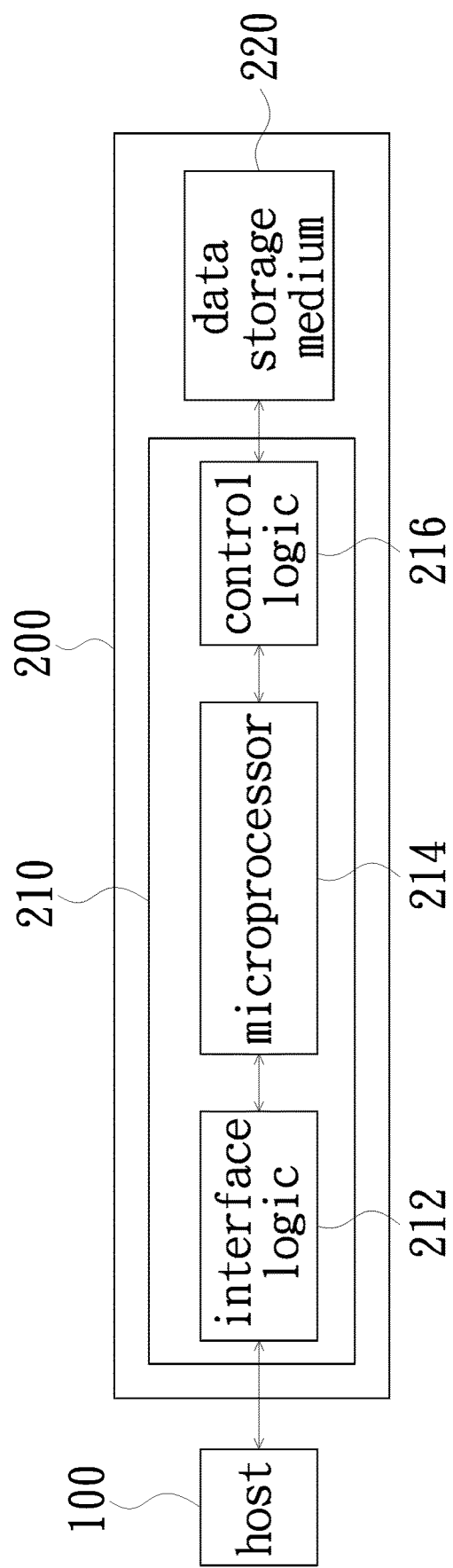
FIG. 1 is a schematic block view of a system constituted by a data storage device and a host in accordance with an embodiment of the present invention.
Figure 2:
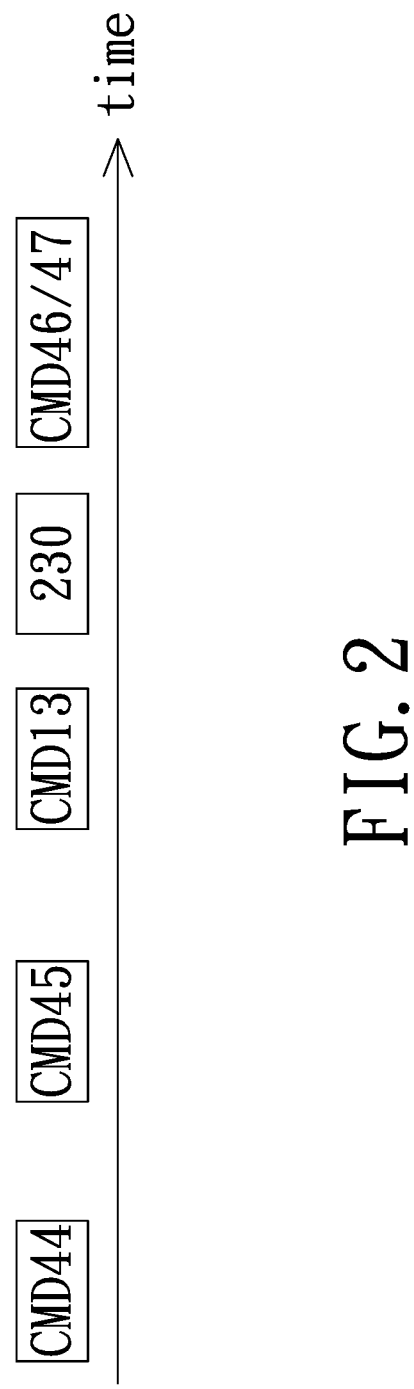
FIG. 2 is a schematic diagram illustrating a general flow of a command queue.

Please refer to FIG. 1, which is a schematic block view of a system constituted by a data storage device and a host in accordance with an embodiment of the present invention. As show, the data storage device 200 of the present embodiment is electrically connected to the host 100. The host 100 may be a computer, mobile phone, tablet PC, camera or other handheld electronic device with computing functions. The data storage device 200 includes a control unit 210 and a data storage medium 220. The control unit 210 includes an interface logic 212, a microprocessor 214 and a control logic 216. The microprocessor 214 is electrically connected to the interface logic 212 and the control logic 216. The microprocessor 214 is configured to access the data stored in the data storage medium 220 through the control logic 216. The microprocessor 214 is further configured to receive a queue command issued from the host 100 through the interface logic 212 and reply the host 100 with queue status information of the present invention according to the received queue command. The microprocessor 214 thereby informs the host 100 to access the data stored in the data storage medium 220 according to the executing order specified in the queue status information of the present invention. The data storage medium 220 may be implemented by a non-volatile memory such as flash memory, MRAM (Magnetic RAM), FRAM (Ferroelectric RAM), PCM (Phase Change Memory), STTRAM (Spin-Transfer Torque RAM), ReRAM (Resistive RAM) and Memristor capable of storing data for a long time. The interface logic 212 is a standard interface logic such as SATA (Serial Advanced Technology Attachment), USB (Universal Serial Bus), PCI Express (Peripheral Component Interconnect Express), NVMe (Non-Volatile Memory express), UFS (Universal Flash Storage), eMMC (embedded MultiMedia Card) or SDIO (Secure Digital Input/Output).

eMMC (version 5.1, release date of February 2015) will be taken as an example for the following description of the present invention, but the present invention is not limited thereto. eMMC can support a queue with up to 32 data transmission tasks (or simply the task), and each task may correspond to a read command or a write command. FIG. 2 is a schematic diagram illustrating a general flow of a command queue. When the data storage device 200 (or the control unit 210) is enabled or switched to a command queue mode, the host 100 issues queue commands to transmit a plurality of tasks to the data storage device 200 for queuing. The aforementioned queue commands exemplarily include a command 44 (CMD44) and a command 45 (CMD45). The command 44 (CMD44) is for transmitting a queued task parameter, which includes: the quantity of data block, task serial number, data transmission direction, priority, etc., wherein the task serial number shall not be repeated. The command 45 (CMD45) is for transmitting a queued task address, which includes: the corresponding logical data block addresses (LBA) of the respective tasks. After the tasks are queued, the host 100 issues a command 13 (CMD13) to query the status of the queued tasks; and consequentially, the data storage device 200 replies the host 100 with queue status information 230 according to the received command 13 (CMD13). Selectively, the queue status information 230 is preferred the queue status information of the present invention in one embodiment; or, the conventional queue status information. That is, the data storage device 200 determines the content of the queue status information 230 (or selects either the queue status information of the present invention or the conventional queue status information) according to the requirements of the command 13 (CMD13). Besides providing which tasks in the queue are ready-for-execution tasks, the queue status information of the present invention also provides a preferred or suggested executing order of the ready-for-execution tasks. Therefore, the data storage device 200 of the present embodiment has improved efficiency by sequentially executing the ready-for-execution tasks according to the executing order. After receiving the queue status information 230, the host 100 may issues a command 46 (CMD46) or a command 47 (CMD47) to the data storage device 200 for the execution of the ready-for-execution tasks in queue.

FIG. 3 a schematic view of an exemplary data structure of queue status information in accordance with an embodiment of the present invention. As shown, the queue status information of the present invention includes 32 bits which are sequentially arranged from bit 0 to bit 31. As described above, the queue status information of the present invention shown in FIG. 3 is replied from the data storage device 200 according to the command 13 (CMD13) issued from the host 100. FIG. 4 a schematic view of an exemplary data structure of conventional queue status information. As shown, each bit in the conventional queue status information represents that the respective task is a ready-for-execution task or not. For example, if the tasks 0, 6, 15 and 21 are ready-for-execution tasks, the bits 0, 6, 15 and 21 in the conventional queue status information each is binary "1" and accordingly the host 100 is aware of which tasks are ready-for-execution tasks. For those not a ready-for-execution task, the corresponding bit is represented by binary "0".

However, the conventional queue status information does not indicate the executing order of the ready-for-execution tasks, and the data storage device 200 may spend more time or consume more resource to complete the ready-for-execution tasks if the ready-for-execution tasks are not executed in a proper order, which may lead to a poor system performance. Therefore, different with the conventional queue status information as illustrated in FIG. 4, the queue status information of the present invention as illustrated in FIG. 3 includes the task quantity of ready-for-execution tasks and the task serial numbers of ready-for-execution tasks which are sorted based on a preferred task executing order; wherein the task quantity and the task serial numbers of the ready-for-execution tasks each are represented by a plurality of bits. In the present embodiment as illustrated in FIG. 3, the task quantity of ready-for-execution task is represented by three bits (i.e., bits 0-2); and correspondingly, the minimum task quantity is zero and the maximum task quantity is 7. In the exemplary embodiment as shown FIG. 3, the task quantity of ready-for-execution task represented by the three bits (i.e., bits 0-2) is 4. The task serial numbers of the four ready-for-execution tasks (i.e., tasks 0, 6, 15 and 21) each are represented by five bits, which starts from the bit 4. In the present embodiment as illustrated in FIG. 3, for example, if the data storage device 200 desires to tell the host 100 that the task 21, 6, 15 and 0 are the four ready-for-execution tasks to be executed sequentially, then the five bits (i.e., bits 4-8) are used to indicate that the first ready-for-execution task is the task 21; the five bits (i.e., bits 9-13) are used to indicate that the second ready-for-execution task is the task 6; the five bits (i.e., bits 14-18) are used to indicate that the third ready-for-execution task is the task 15; and the five bits (i.e., bits 19-23) are used to indicate that the fourth ready-for-execution task is the task 0.

It is to be noted that because of the data length of the queue status information 230 is 32 bits, the queue status information of the present invention designed according to the above data structure is limited to provide task serial numbers of up to five ready-for-execution tasks. However, through configuring the data storage device 200 to reply the host 100 with more than one piece of the queue status information of the present invention, all of the ready-for-execution tasks can be sequentially provided to the host 100 according to a preferred executing order. It is understood that based on the spirit of the present invention, the queue status information of the present invention is able to provide task serial numbers of more than five ready-for-execution tasks when the data length of the queue status information 230 is extended to 64 or 128 bits. In addition, the task quantity of ready-for-execution task is up to 15 if four bits instead of three bits are reserved for indicating the task quantity of ready-for-execution task. The aforementioned bit numbers for indicating the task quantity of ready-for-execution task and the task serial number of ready-for-execution task arranged in a preferred executing order are for an exemplary purpose only and the present invention is not limited thereto; that is, the bit numbers are adjustable in response to the actual design requirement. Further, in the present embodiment, bits 3 and 29~31 are reserved bits (with a status 0). The aforementioned position and quantity of the reserved bits are for an exemplary purpose only and the present invention is not limited thereto; that is, the position and quantity of the reserved bits are adjustable in response to the actual design requirement. Further, the function of the reserved bit can be defined in response to the actual design requirement, and no redundant detail is to be given herein.

In addition, the data length of the command 13 (CMD13) issued from the host 100 is 16 bits. Specifically, if bits 14-15 are binary "01", then the data storage device 200 replies the host 100 with the conventional queue status information; alternatively, if bits 14-15 are binary "11", then the data storage device 200 replies the host 100 with the queue status information of the present invention. Namely, the data storage device 200 can select and reply the host 100 with the specific queue status information according to the content of the command 13 (CMD13).

Figure 5:
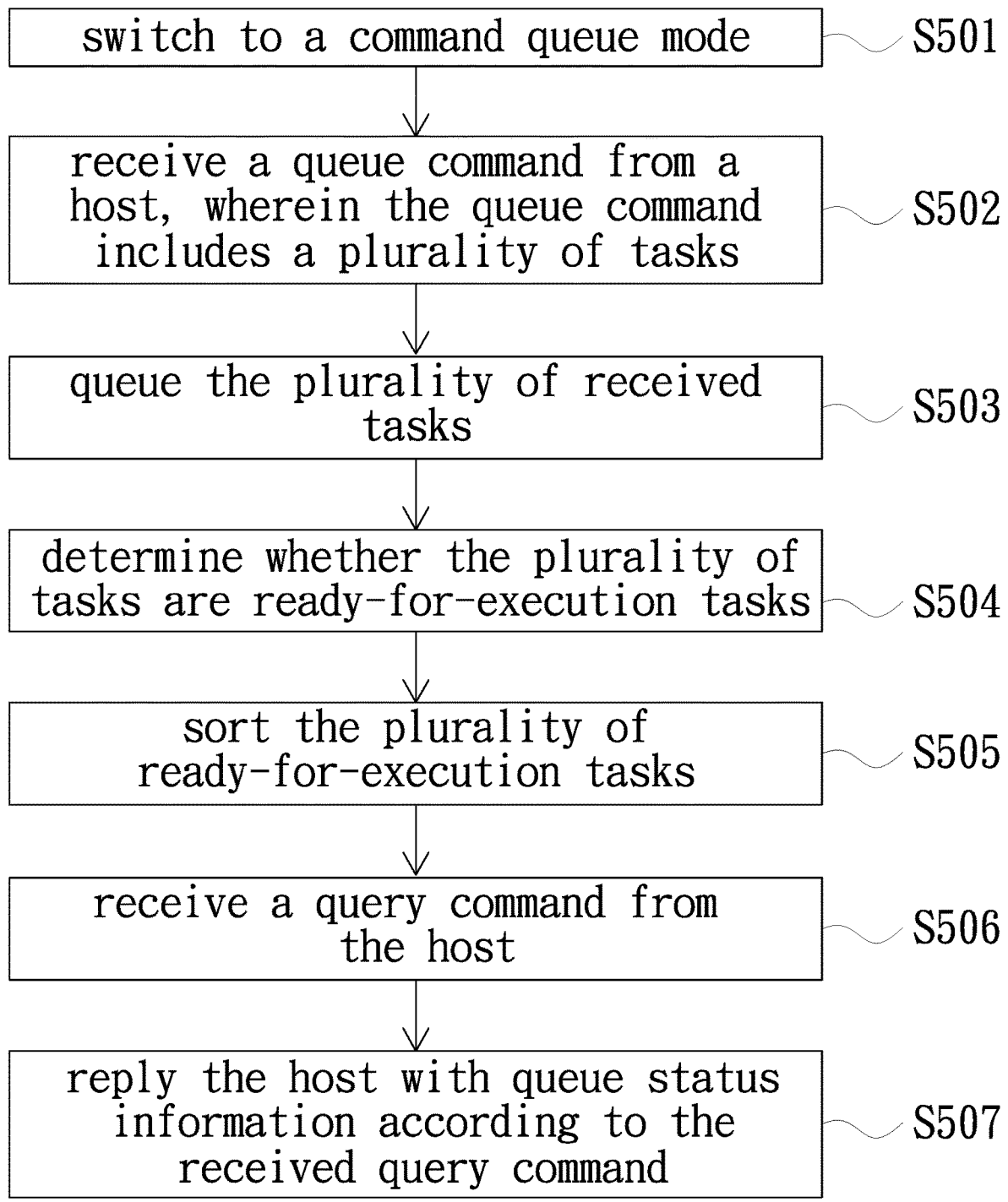
FIG. 5 is a flowchart of a task queuing method in accordance with an embodiment of the present invention.

FIG. 5 is a flowchart of a task queuing method in accordance with an embodiment of the present invention, which includes steps S501-S507. In step S501, the data storage device 200 (or the control unit 210) is switched to a command queue mode. In step S502, the data storage device 200 receives a queue command from the host 100, wherein the queue command includes a plurality of tasks. In step S503, the data storage device 200 queues the plurality of received tasks. In step S504, the data storage device 200 determines whether the plurality of tasks are ready-for-execution tasks; wherein the aforementioned determination is prior art and no redundant detail is to be given herein. In step S505, the data storage device 200 sorts the plurality of ready-for-execution tasks; wherein the aforementioned sorting for the executing order of the ready-for-execution tasks can be based on the task serial number, priority, the read or write operation on the same logical block address or the continuity of logical block address. In step S506, the data storage device 200 receives a query command (e.g., the command 13 (CMD13)) from the host 100. In step S507, the data storage device 200 replies the host 100 with queue status information according to the received query command; specifically, the data storage device 200 is able to selectively reply the host 100 with the conventional queue status information or the queue status information of the present invention according to the requirement of the query command.

In summary, by configuring the data storage device of the present invention to provide the queue status information, the host can sequentially execute the ready-for-execution tasks according to the task quantity and task serial number of the ready-for-execution tasks contained in the queue status information; and therefore, the data storage device of the present invention has improved executing performance.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A data storage device, comprising:
a data storage medium; and
a control unit, electrically connected to the data storage medium, wherein when switched to a command queue mode, the control unit includes an interface logic, a control logic, and a microprocessor, the microprocessor is configured to access data stored in the data storage medium through the control logic, receive, through the interface logic, a queue command comprising a plurality of data transmission tasks from a host, determine whether the data transmission tasks are ready-for-execution tasks, sort the ready-for-execution tasks and reply the host with first queue status information,
wherein the first queue status information contains a task quantity of the ready-for-execution tasks and a plurality of task serial numbers of the ready-for-execution tasks which are sorted based on a preferred task executing order of the ready-for-execution tasks, the task quantity of the ready-for-execution tasks and the task serial numbers of the ready-for-execution tasks are respectively represented by a plurality of bits, and the queue command further comprises a queue command parameter and a queue command address,
wherein the microprocessor is further configured to selectively reply the host with second queue status information, wherein the second queue status information does not contain the at least one task serial number corresponding to the at least one sorted ready-for-execution task, and
wherein the host issues a command to the data storage device for execution of the sorted ready-for-execution tasks.

2. A control unit, comprising:
a control logic;
an interface logic; and
a microprocessor, electrically connected to the interface logic and the control logic, wherein the microprocessor is configured to access data stored in a data storage medium through the control logic, receive a queue command comprising a plurality of data transmission tasks issued from a host through the interface logic, determine whether the data transmission tasks are ready-for-execution tasks, sort the ready-for-execution tasks and reply the host with first queue status information, wherein the first queue status information contains a task quantity of the ready-for-execution tasks and a plurality of task serial numbers of the ready-for-execution tasks which are sorted based on a preferred task executing order of the ready-for-execution tasks, the task quantity of the ready-for-execution tasks and the task serial numbers of the ready-for-execution tasks are respectively represented by a plurality of bits, and the queue command further comprises a queue command parameter and a queue command address,
wherein the microprocessor is further configured to selectively reply the host with second queue status information, wherein the second queue status information does not contain the at least one task serial number corresponding to the at least one sorted ready-for-execution task, and
wherein the host issues a command to the data storage device for execution of the sorted ready-for-execution tasks.

3. A task sorting method for a data storage device, the task sorting method comprising:
- switching to a command queue mode;
- receiving a queue command from a host, wherein the queue command comprises a plurality of data transmission tasks;
- queuing the data transmission tasks;
- determining whether the tasks are ready-for-execution tasks;
- sorting the ready-for-execution tasks;
- replying the host with first queue status information, wherein the first queue status information contains a task quantity of the ready-for-execution tasks and a plurality of task serial numbers of the ready-for-execution tasks which are sorted based on a preferred task executing order of the ready-for-execution tasks, the task quantity of the ready-for-execution tasks and the task serial numbers of the ready-for-execution tasks are respectively represented by a plurality of bits, and the queue command further comprises a queue command parameter and a queue command address,
- selectively reply the host with second queue status information, wherein the second queue status information does not contain the at least one task serial number corresponding to the at least one sorted ready-for-execution task; and
- issuing a command to the data storage device for the execution of the sorted ready-for-execution tasks.

* * * * *